United States Patent [19]
Floren

[11] 3,913,400
[45] Oct. 21, 1975

[54] PLASTIC METER BOX
[75] Inventor: Carl E. Floren, Decatur, Ill.
[73] Assignee: Mueller Co., Decatur, Ill.
[22] Filed: Apr. 10, 1974
[21] Appl. No.: 459,790

[52] U.S. Cl................................... 73/273; 73/431
[51] Int. Cl.² ........................................ G01F 15/14
[58] Field of Search...................... 73/201, 273, 431

[56] References Cited
UNITED STATES PATENTS

| | | | |
|---|---|---|---|
| 978,384 | 12/1910 | Lofton | 73/201 |
| 1,133,386 | 3/1915 | Lofton | 73/201 |
| 3,212,339 | 10/1965 | Olmedo | 73/431 |
| 3,443,436 | 5/1969 | Meyer | 73/273 |

*Primary Examiner*—Richard C. Queisser
*Assistant Examiner*—John P. Beauchamp
*Attorney, Agent, or Firm*—Cushman, Darby & Cushman

[57] ABSTRACT

A plastic meter box is disclosed for housing a fluid meter below the ground level wherein the box includes a side wall enclosure having at least two openings proximate the bottom thereof for receiving pipes which communicate fluid with respect to a fluid meter positioned within the enclosure. A base plate is fixedly secured to the bottom of the side wall enclosure by means of a plurality of plastic rivets. The base plate is formed of a thermoplastic material and has three levels, an upper level, an intermediate level and a lower level. The lower level of the base plate has a plurality of holes therethrough for permitting the egress of fluid with respect to the box. The intermediate level supports a yoke which in turn supports the fluid meter positioned within the box. The upper level of the base plate serves to position the yoke within the meter box and hence to maintain the position of the fluid meter with respect to the meter box. In addition, the upper level facilitates the positioning of the meter box onto the base plate before the plastic rivets are assembled.

10 Claims, 5 Drawing Figures

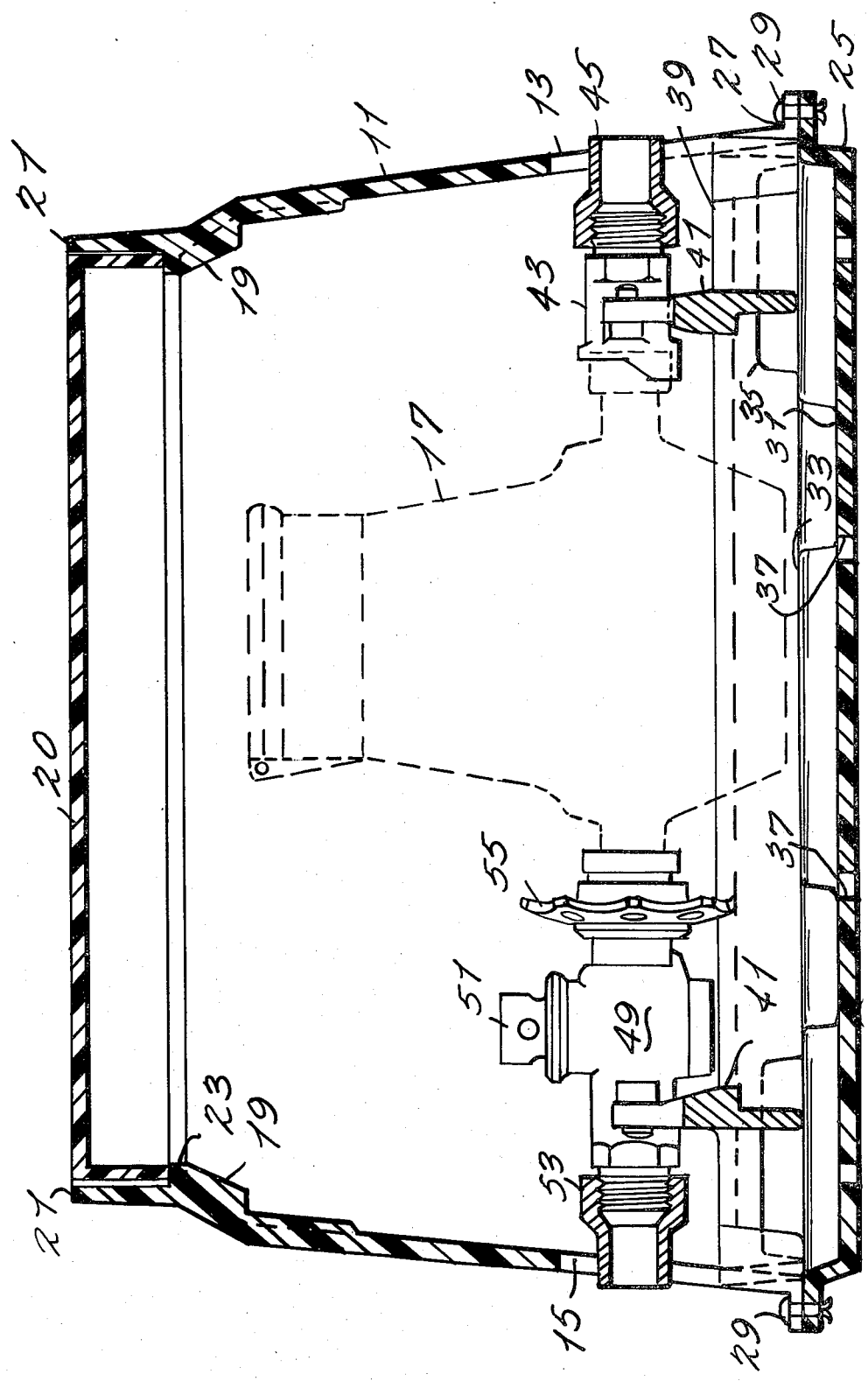

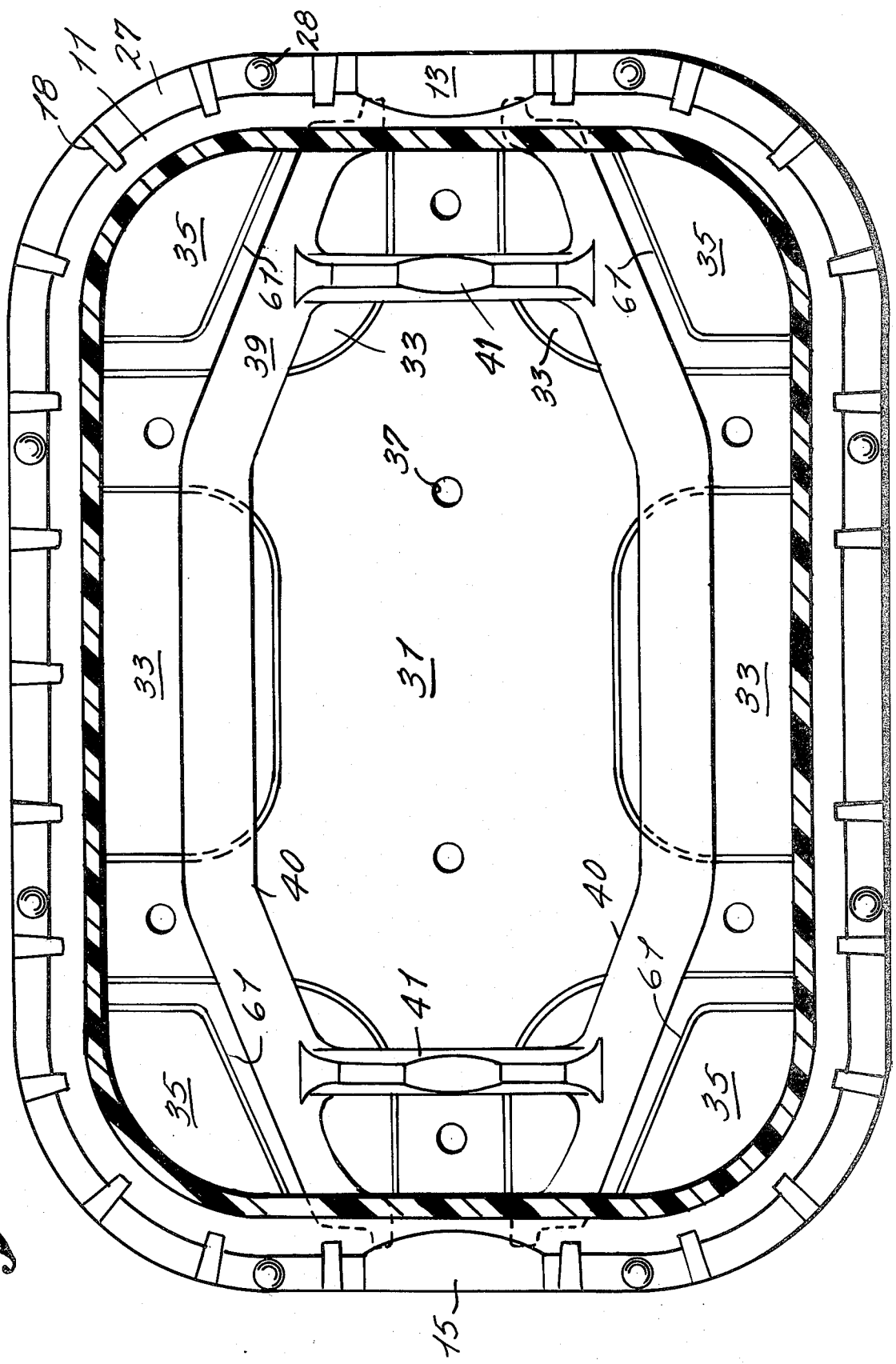

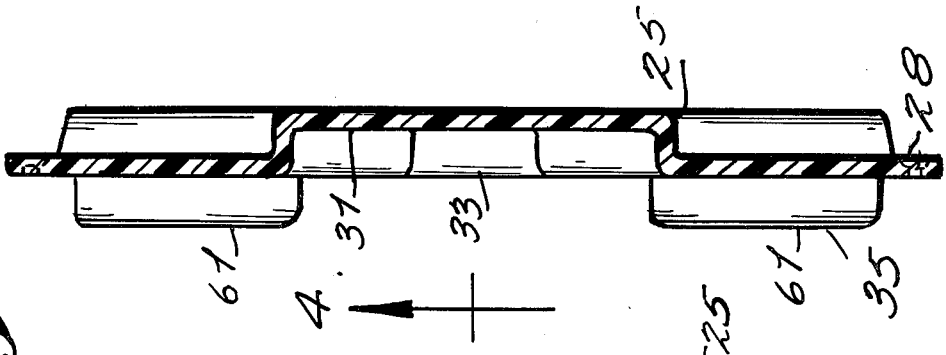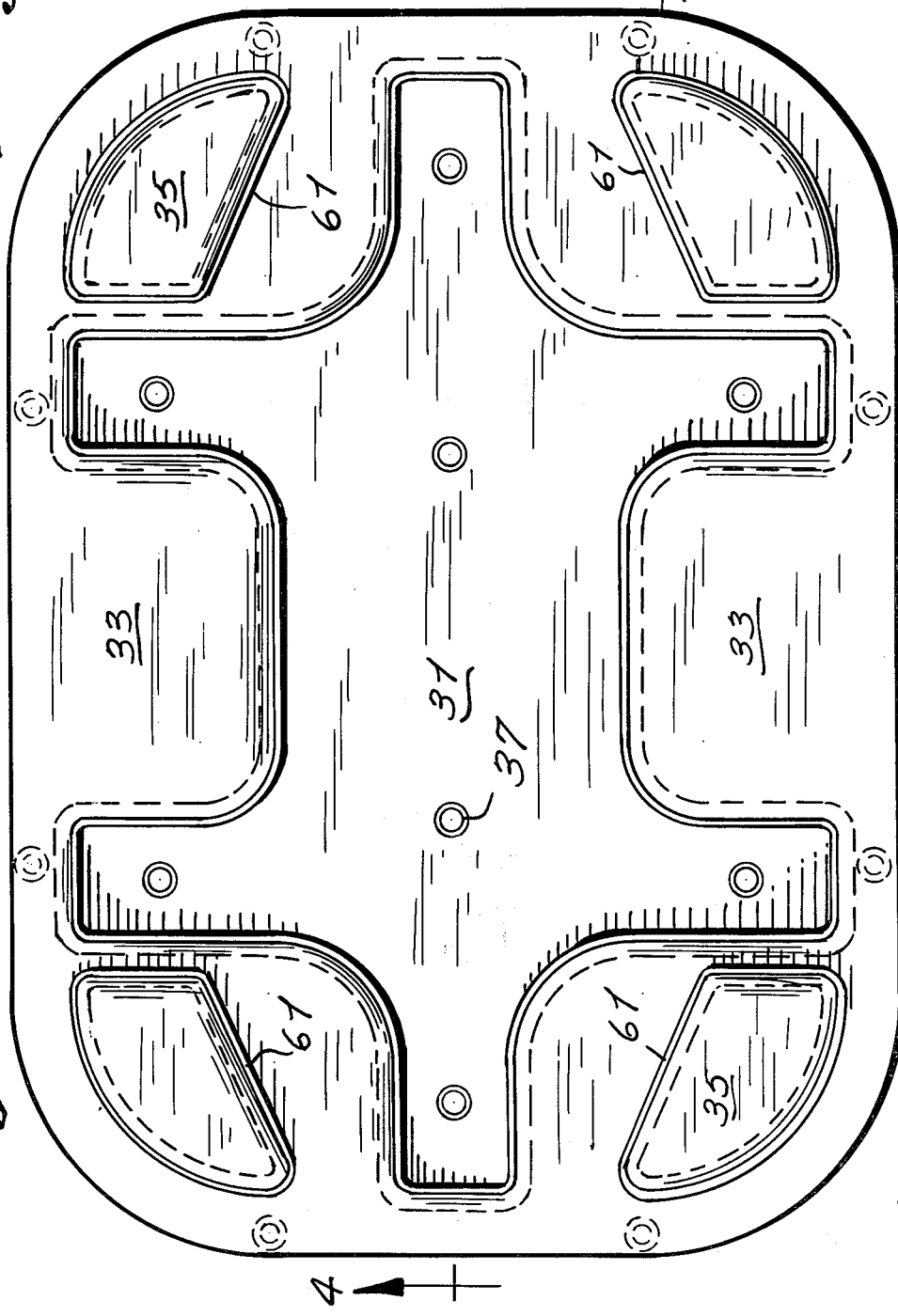

PLASTIC METER BOX

BACKGROUND OF THE INVENTION

This invention relates to a noncorrosive fluid meter box for housing a fluid meter below the ground level.

In many locations it is often desirable to position water and gas meters outside of the house to which the fluid is being conducted. Thus, the fluid meter must be positioned in a location which is convenient to the meter reader while at the same time being located where the meter cannot be damaged by inadvertently striking or otherwise deforming the meter. It therefore is customary to position the fluid meter below the ground level. By positioning the meter below the ground level, unauthorized personnel do not have ready access to the meter and in addition, in the case where the meter is utilized to measure the quantity of water flowing into a house, the meter can be positioned below the freezing level of the ground. As illustrated in U.S. Pat. No. 950,270, underground meters originally were positioned within box-like structures having tamper-proof locks at the top thereof thereby permitting only authorized personnel to gain access to the meter positioned within the box. The bottom of the meter box was typically left open so that water leaking from the meter could be absorbed into the ground. Such a meter box arrangement has proved to be inadequate because the movement of the ground skewed the position of the face plate of the meter so that it became difficult to read. In addition with time the meter box had a tendency to settle further into the ground thereby moving the relative position of the meter itself upward toward and possibly even against the top of the meter box. Such an occurrence would likely result in damage to the meter itself. Accordingly, as disclosed in U.S. Pat. No. 654,615, underground meter boxes were provided with a base plate which prevented movement of the meter box further into the ground and in addition limited the quantity of water that could flow into the meter box and around the meter.

Later meter boxes were provided, as illustrated in U.S. Pat. No. 1,107,532, with holes in the base plate to permit the ingress and egress of water with respect to the meter box. Thus, if water should leak from the water meter or the connecting valves thereof, the water could pass through the holes in the bottom of the base plate and be absorbed into the ground. Another example of a meter housing structure having drainage holes proximate the bottom thereof is illustrated in U.S. Pat. No. 3,443,436. In both of these patents the base plate of the meter housing is of a uniform, generally flat configuration. Such a base plate arrangement does not prevent lateral shifting of the meter box with the heaving of the ground brought about by inclement weather conditions such as freezing temperatures and heavy rain. In addition, the flat base plate structure did not provide added support to the meter housing against the inwardly directed pressure caused by the ground surrounding the meter housing.

It therefore is an object of this invention to provide a meter box having an improved base plate structure.

It is another object of this invention to provide a meter box having a base plate with a plurality of levels therein.

It is yet another object of this invention to provide a meter housing having a base plate which is formed of a thermoplastic material.

SHORT STATEMENT OF THE INVENTION

Accordingly, this invention relates to a plastic meter box for housing a meter below the ground level wherein the meter box includes a side wall enclosure having at least two openings therein proximate the bottom of the wall for receiving pipes which conduct fluid with respect to the meter housed within the box.

A base plate is fixedly secured to the side wall enclosure at the bottom thereof by means of a plurality of plastic rivets. The base plate is formed of thermoplastic and has at least three levels, an upper level, an intermediate level and a lower level, wherein the lower level includes means for permitting the egress of fluid with respect to the meter box. The intermediate level provides a means for supporting the meter above the fluid which passes through the holes in the lower level of the base plate and the upper level maintains the meter in position within the meter box. In addition, the upper level facilitates the positioning of the meter box onto the base plate before the plastic rivets are assembled.

A yoke having an annular collar portion and at least one saddle portion is positioned on the intermediate level of the base plate and is restrained from lateral movement by the inwardly directed walls of the upper level of said base plate. The saddle portions of the yoke support the meter above the base plate so that fluid on the base plate does not make contact with the meter.

BRIEF DESCRIPTION OF THE DRAWINGS

Other objects, features and advantages of the invention will become more fully apparent from the following detailed description, appended claims and accompanying drawings in which:

FIG. 1 is a side section view of the meter box of the present invention showing the meter positioned therein:

FIG. 2 is a sectional plan view of the meter box of the present invention;

FIG. 3 is a plan view of the base plate of the meter box;

FIG. 4 is a section view of the base plate taken along the line 4—4 of FIG. 3; and FIG. 5 is an end section view of the base plate taken along the lines 5—5 of FIG. 3.

DETAILED DESCRIPTION OF THE PREFERRED EMBODIMENT

Refer now to FIG. 1 which is a side section view of the meter box of the present invention showing a meter and valve positioned therein. As illustrated, the meter box includes a side wall enclosure 11 which is formed of a thermoplastic material. The side wall enclosure is preferably made by means of a conventional molding process well known in the art. Proximate the bottom of the side wall enclosure are a pair of outlets 13 and 15. These outlets provide access to the exterior of the meter box for pipes which conduct water with respect to the meter 17. Proximate the top of the meter box are a plurality of ribs 19, which are formed integral with the side wall enclosure. These ribs provide added support against the inwardly directed pressure of the ground surrounding the meter box. A lid 20 is positioned in the mouth 21 of the top of the meter box and rests upon a collar portion 23 extending about the internal periphery of the mouth of the meter box. A base plate 25 is secured to the bottom lip portion 27 of the side wall enclosure by means of a plurality of plastic rivets 29. Plastic rivets are utilized in order to prevent corrosion from damaging or weakening the interconnection between the base plate and the side wall enclosure. However, it should be understood that other noncorrosive holding means such as clips, nuts and bolts, etc., formed of plastic or metal, could be utilized in place of the plastic rivets. The base plate 25 is formed of a structural foam polyethylene thermoplastic material which is not only lightweight but also is very strong and easy to maneuver both during the installation of the meter box and during the transporting of the base plate from the factory to the site. Structural foam thermoplastic materials and the method for making same are disclosed in U.S. Pat. Nos. 3,436,446 and 3,268,638 which patents are assigned to the Union Carbide Corporation. However, it should be understood that any suitable thermoplastic material could be utilized in place of structural foam thermoplastic.

It can be seen that since the side wall enclosure 11, the base plate 25 and the plastic rivets 29 for securing the base plate to the side wall enclosure are each made of a plastic material, the detrimental effects of corrosion experienced in prior art underground meter boxes are overcome. In addition, the components forming the meter box are of a light weight construction, while at the same time providing adequate support against the ground pressure exerted against the meter box. Because of the light weight structure of the plastic components, the meter box can be easily installed below the ground level.

The base plate 25 has multiple levels, that is, a lower level 31, an intemediate level 33, and an upper level 35. The lower level 31 has a plurality of holes 37 therethrough for permitting water which might leak from the water meter 17 or enter into the meter housing from the lid 20 to pass through the base plate and be absorbed by the ground. The intermediate level 33 supports a yoke member 39 thereon so that the yoke is raised with respect to the water level at the base of the meter housing. The upper level as will be explained more fully hereinbelow, positions the yoke so that the meter 17 does not move about within the housing in response to the heaving of the ground brought about by temperature variations and humidity conditions within the soil surrounding the meter housing. In addition, the upper level facilitates the positioning of the meter box onto the base plate before the plastic rivets are assembled. The yoke 39 includes a pair of saddle portions 41 which are formed intergral therewith and which support the meter 17 in spaced relationship to the lower level 31 of the base plate 25. The meter 17 may be of any suitable type known in the art and is connected at its outlet side to a connection outlet 43 which is fastened to the saddle 41. The connection outlet 43 in turn is connected to a coupling nut 45 which communicates with an outlet pipe (not shown) which passes into the house to which the fluid is being supplied.

On the inlet side of the meter is a meter valve 49 having a valve head 51 which can be appropriately turned on and off by means of a tool connected thereto when the lid 20 is opened. The meter valve 49 controls the fluid flow into the dwelling. The inlet side of the meter valve 49 is connected to a coupling nut 53 which in turn is connected to a pipe (not shown) which couples the fluid from the service main to the meter valve 49. At the outlet side of the meter valve is a hand wheel expansion member 55 which varies the distance between the meter 17 and the meter valve 49. Hand wheel expansion members are known in the art and the operation thereof accordingly will not be set forth herein in detail.

Refer now to FIG. 2 which is a sectional plan view of the meter housing of the present invention. As illustrated, the side wall enclosure 11 slopes outwardly from top to bottom, in order to increase the strength of the meter box and to prevent easy removal of the meter box from the ground. Ribs 18 are shown positioned about the external periphery of the side wall enclosure and serve to increase the strength of the side wall enclosure. The bottom of the side wall enclosure is terminated in a collar portion 27 which extends around the periphery of the enclosure. Holes 28 are formed through the collar portion 27 for receiving the rivets 29 illustrated in FIG. 1. The opening 13 and 15 at each end of the side wall enclosure, as illustrated, permit the insertion of a pipe extending from the service line to the meter box and from the meter box to the house.

The base plate 25 is in the form of a cruciform with the lower level 31 thereof having a plurality of holes 37 therethrough for permitting the egress of water with respect to the meter housing. The intermediate level of the base plate is in the form of a number of discontinuous platforms 33 positioned about the outside of the base plate. These platforms support the yoke 39 thereon so that the yoke does not come into contact with water or other fluids which might coat the lower level 31 of the base plate. The upper level 35 of the base plate is in the form of four mesas which are located in the respective corners of the base plate. The four upper level portions 35 each have a side wall 61 which is located proximate the outside edge of the yoke 39 and restrain the lateral movement of the yoke so that the meter supported thereby does not shift within the meter box. In addition, the upper level facilitates the positioning of the meter box onto the base plate before the plastic rivets are assembled.

The yoke 39 has a collar portion 40 and at least two saddle portions 41. The collar portions extend along the longitudinal length of the meter housing and are appropriately spaced by the saddle portions 41 so that the edges of the collar are located proximate the side wall surfaces 61 of the upper level of the base plate 25. The saddle portions of the yoke receive the connection outlet 43 and the shank of the meter valve 49 for supporting the meter with respect to the meter housing. In the preferred embodiment, the shank is formed of a material such as iron or steel but it should be understood that a plastic material could be utilized in lieu of a metallic material.

Refer now to FIGS. 3–5. FIG. 3 illustrates the top of the base plate which is of generally rectangular shape. The lower level of the base plate is cruciform shaped and includes a plurality of holes therethrough for permitting the egress of water from the meter housing. The intermediate level of the base plate includes a plurality of discontinuous platform 33 which extend about the periphery of the base plate and which, as aforementioned, support the yoke which in turn supports the meter. The raised upper levels 35 of the base plate 25 each includes a side wall 61 which is designed to mate with the outside edge of the yoke 39 so as to provide a restraining surface for inhibiting lateral movement of the yoke within the housing. The multi-level structure of the base plate increases the stiffness of the meter box and in addition aids in maintaining the meter box in position since the ground line below the meter box tends to work into the depressions formed by the raised surfaces thereof. In addition, since the drain holes for the base plate are at a lower level than the level at which the yoke and meter are supported, neither the yoke or the meter are subject to the continuous corrosive effect of fluids which might lay at the bottom of the meter box.

While applicant's invention has been disclosed in connection with a preferred embodiment thereof, it should be understood that there may be other modifications of applicant's invention which fall within the spirit and scope of the invention as defined by the appended claims.

What is claimed is:

1. A plastic meter box for housing a meter below the ground level comprising a side wall enclosure having at least two openings therein for receiving fluid flow means for communicating with said meter, a base plate fixedly secured to said side wall enclosure to form a chamber for housing said meter, said base plate having in elevation at least three levels, an upper level, an intermediate level, and a lower level, said lower level having a plurality of holes therethrough for permitting the egress of fluid with respect to said box, and a meter supporting yoke supported on said intermediate level of said base and maintained in a predetermined position by said upper level of said base plate, said multi-level base plate providing a ground lock for said meter box and increasing the relative strength of said meter box.

2. A plastic meter box for housing a meter below the ground level comprising a side wall enclosure having at least two openings therein proximate the bottom thereof for receiving means for conducting fluid with respect to said meter, a base plate fixedly secured to said side wall enclosure to form a chamber for housing said meter, said base having a plurality of holes therethrough for permitting the egress of fluid with respect to said meter box, a meter supporting yoke supported in said base plate, means for maintaining said meter box from moving laterally when in position, means including said base plate for maintaining said yoke in a predetermined position in said meter box, and means for maintaining said yoke and meter raised with respect to the water passing through said holes.

3. A plastic meter box for housing a meter below the ground level comprising a side wall enclosure having at least two openings therein proximate the bottom thereof for receiving means for conducting fluid with respect to said meter, said side wall enclosure sloping inwardly from bottom to top and having a plurality of supporting ribs proximate the top thereof, and a base plate fixedly secured to said side wall enclosure to form a chamber for housing said meter, said base plate being formed of thermoplastic and having at least three levels, an upper level, an intermediate level and a lower level, said lower level including means for permitting the egress of fluid with respect to said meter box, said intermediate level providing a means for supporting said meter above the fluid egressing through said lower level of said base plate, and said upper level maintaining said meter in position in said meter box.

4. The meter box of claim 3 further comprising a yoke having collar portions and at least one saddle portion, said meter being spaced with respect to said base plate by said saddle portion of said yoke and said collar portions being positioned on said intermediate level of said base plate and maintained in position by said upper level of said base plate.

5. The meter box of claim 4 wherein said intermediate level of said base plate is noncontinuous about the periphery thereof, wherein said upper level of said base plate is formed at a plurality of positions and wherein the walls of said upper level face inwardly from the periphery of said base plate to position said collar portions of said yoke.

6. The meter box of claim 5 wherein said base plate is formed integral by a molding process.

7. The meter box of claim 6 wherein said base plate is fixedly secured to said side wall enclosure by means of a plurality of non-corrosive units.

8. The meter box of claim 4 wherein said lower portion of said base plate is cruciform shaped and said intermediate level thereof is noncontinuous about the periphery thereof.

9. The meter box of claim 4 wherein said base plate is formed of foamed thermoplastic.

10. The meter box of claim 9 wherein said base plate is fixedly secured to said side wall enclosure by means of a plurality of plastic rivets.

* * * * *